United States Patent [19]

Ehrlich

[11] Patent Number: 4,763,913

[45] Date of Patent: Aug. 16, 1988

[54] BICYCLE/SCOOTER COMBINATION

[75] Inventor: William Ehrlich, Bethlehem, Pa.

[73] Assignee: Bicycle Corporation of America, Bethlehem, Pa.

[21] Appl. No.: 100,550

[22] Filed: Sep. 24, 1987

[51] Int. Cl.⁴ .......................... B62K 19/00; B62N 1/04
[52] U.S. Cl. .......................... 280/281 R; 280/87.04 R
[58] Field of Search ...... 280/281 R, 281 LP, 87.04 R, 280/221

[56] References Cited

U.S. PATENT DOCUMENTS

| 1,977,470 | 10/1934 | Clark | 280/281 |
| 3,006,659 | 10/1961 | Krasnoff et al. | 280/87.04 R |
| 3,337,240 | 8/1967 | Rizzato | 280/281 |
| 3,647,241 | 3/1972 | Huyssen | 280/221 |

FOREIGN PATENT DOCUMENTS 226362 12/1924 United Kingdom .
225332 12/1924 United Kingdom .

Primary Examiner—John J. Love
Assistant Examiner—Donn McGiehan
Attorney, Agent, or Firm—Spencer & Frank

[57] ABSTRACT

A bicycle/scooter combination has a support tube assembly including two lower support tubes each having a front terminus affixed to the head tube; a downwardly extending front portion; a rearwardly extending horizontal portion; and an upwardly extending rear portion including a rear terminus of the lower support tubes. The rear terminus is affixed to the bracket shell. There is further provided an upper support tube having an upper terminus affixed to the head tube and a lower terminus attached to the rearwardly extending horizontal portion of the lower support tubes; a horizontal platform supported by the rearwardly extending horizontal portions of the lower support tubes; and chain stays each having a front end affixed to the upwardly extending rear portions of the lower support tubes and a rear end carrying a rear-wheel supporting plate.

6 Claims, 1 Drawing Sheet

BICYCLE/SCOOTER COMBINATION

BACKGROUND OF THE INVENTION

This invention relates to two-wheeled vehicles, more particularly, to bicycles and scooters.

In bicycles, during travel, the user is positioned on a bicycle seat; the feet are generally continuously off the ground and, for propulsion, tread on a pair of pedals transmitting a torque to one of the wheels. A certain degree of acquired balancing skill is needed to maintain the vehicle in upright equilibrium.

In scooters the user stands on a low horizontal platform of the vehicle, grasps the handle bar for steering and, for propulsion, intermittently pushes the scooter forward with one foot performing a quasi-running motion on the ground while the other foot rests on the platform. Because the user's foot can make easy and immediate contact with the ground to provide a three point (and thus stable) support on the ground or to get off the vehicle altogether, and further because of the extremely low-lying center of gravity, particularly during use, a scooter requires a much lower degree of balancing skill than a bicycle and therefore, particularly children who are being introduced to two-wheeled vehicles, find more confidence and safety in using scooters first.

A transition from the use of a scooter to the use of a bicycle has traditionally involved two entirely different vehicles, particularly because the accommodation of the user, the method of propulsion as well as structural and stability requirements for the two types of vehicles have been significantly different and often inconsistent with one another.

It is known in the prior art to provide a basic two-wheeled vehicle construction which, by substantial userperformed conversions may be utilized either as a bicycle or as a scooter. Such a construction is disclosed, for example, in United Kingdom Patent No. 226,362, according to which a conversion from bicycle to scooter involves the removal of the entire propulsion mechanism, that is, the bracket shell, the crank, the sprocket wheel and the chain as well as the entire seat structure such as seat post, seat tube and seat stays and the installation of a low platform on a bottom horizontal frame tube. The permanent parts for use in both modes (bicycle or scooter) are only the front wheel-and-steering assembly, the generally horizontal, low lying tubes constituting the frame and the rear wheel. This prior art construction does not provide the possibility for the user to utilize the two-wheeled vehicle at will in an alternating fashion since this prior art vehicle cannot be a bicycle and a scooter at the same time.

SUMMARY OF THE INVENTION

It is an object of the invention to provide a two-wheeled vehicle which is, at all times, simultaneously a bicycle and a scooter and which thus may be used at will in one mode or the other without the need to perform any conversion work whatever.

This object and others to become apparent as the specification progresses, are accomplished by the invention, according to which, briefly stated, there is provided a bicycle/scooter combination which has a support tube assembly including two lower support tubes each having a front terminus affixed to the head tube; a downwardly extending front portion; a rearwardly extending horizontal portion; and an upwardly extending rear portion including a rear terminus of the lower support tubes. The rear terminus is affixed to the bracket shell. There is further provided an upper support tube having an upper terminus affixed to the head tube and a lower terminus attached to the rearwardly extending horizontal portion of the lower support tubes; a horizontal platform supported by the rearwardly extending horizontal portions of the lower support tubes; and chain stays each having a front end affixed to the upwardly extending rear portions of the lower support tubes and a rear end carrying a rear-wheel supporting plate.

DESCRIPTION OF THE PREFERRED EMBODIMENT

Figure 1:
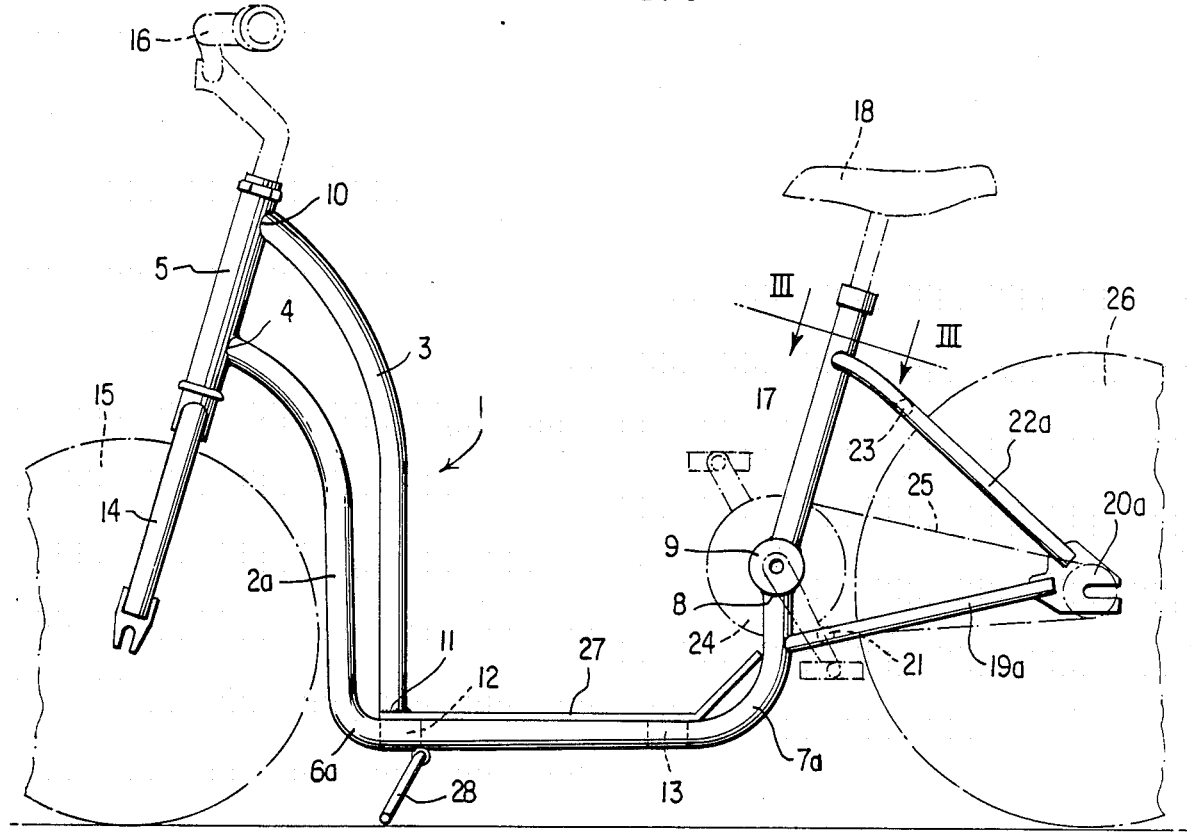
FIG. 1 is a side elevational view of a preferred embodiment of the invention.
Figure 2:
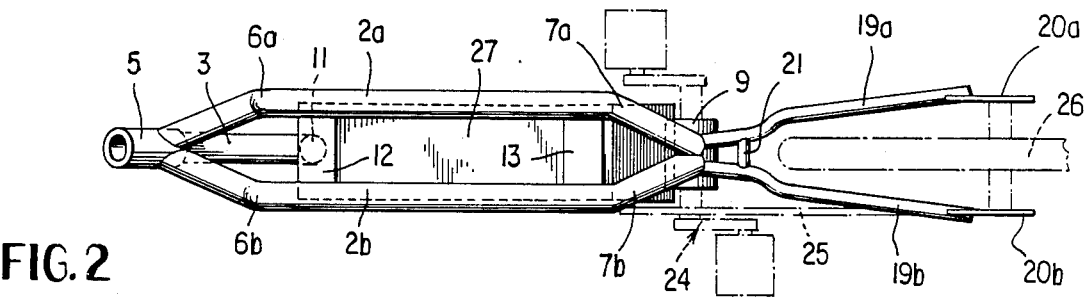
FIG. 2 is a bottom plan view of FIG. 1.

Turning to FIGS. 1 and 2, there is illustrated therein the frame of the scooter/bicycle according to the invention. It is noted at the outset that components not illustrated or shown only in phantom lines are conventional, well known bicycle parts, functioning in a conventional manner.

The scooter/bicycle frame comprises a support tube assembly generally designated at 1. It includes two generally horizontally adjacent lower support tubes 2a, 2b and an upper support tube 3.

Viewing the lower support tubes 2a, 2b from the front of the scooter/bicycle in the rearward direction, the lower support tubes 2a, 2b merge at their front terminus 4 and are welded to a rearwardly facing surface portion of a head tube (head shell) 5. From their connection with the head tube 5 the lower support tubes 2a, 2b diverge and curve rearwardly and obliquely downwardly and then extend in a vertical plane as vertical support posts. Thereafter, while forming front bends 6a, 6b, the lower support tubes 2a, 2b change into parallel-spaced horizontally extending support portions until they form rear bends 7a, 7b which converge and merge in a rear terminus 8 where the lower support tubes 2a, 2b are welded to the underside of a bracket shell 9.

The upper support tube 3 is welded at its upper end 10 to the head tube 5 at a location spaced vertically from the front terminus 4 of the lower support tubes 2a, 2b. The upper support tube 3 curves downwardly and then changes into a generally linear vertical course where it extends parallel to and spaced rearwardly from the vertical support tube portions of the lower support tubes 2a, 2b. The upper support tube 3 has a lower terminus 11 which is situated between the horizontal tube portion of the lower support tubes 2a, 2b and which is welded to a front strut 12 which, in turn, is a transverse member welded to the lower support tubes 2a, 2b. A rear strut 13 is arranged at a rearward distance from the front strut 12 and is also welded to the lower support tubes 2a, 2b.

The head tube 5 conventionally supports at its lower end a fork 14 on which the only symbolically shown front wheel 15 is mounted. Further, the head tube 5 coaxially supports a conventional steering assembly (steering column and handlebars) shown in broken lines at 16.

To an upper surface portion of the bracket shell 9 there is welded the lower terminus of an upwardly extending and slightly rearwardly inclining seat tube 17 which conventionally supports a seat assembly (seat post and seat mounted thereon) designated at 18.

To the vertical rear terminal parts of the joined lower support tubes 2a, 2b there is welded the respective front terminus of chain stays 19a, 19b which extend rearwardly and are inclined slightly upwardly and generally are of divergent orientation. At their rear terminus the chain stays 19a, 19b are welded to respective dropout plates 20a, 20b. For purposes of superior vertical and lateral strength for use either as a bicycle or as a scooter, the chain stays 19a, 19b are welded to the lower support tubes 2a, 2b at a distance of approximately 3.5 inches below the bracket shell 9. A tubular strut 21 connects the two chain stays 19a, 19b for further increasing their strength and rigidity.

Figure 3:
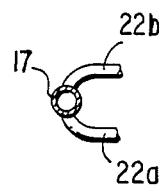
FIG. 3 is a sectional view taken along line III—III of FIG. 1.

Also referring to FIG. 3, to an upper part of the seat tube 17 there are bilaterally welded parallel-extending seat stays 22a, 22b which, at their rear terminus are welded to the dropout plates 20a, 20b at a location above the connection with the chain stays 19a, 19b. A tubular strut 23 connects the two seat stays 22a, 22b.

The bracket shell 9 supports a conventional pedal assembly 24 (including pedals, crank arms, a shaft passing through the bracket shell as well as a sprocket wheel carried by the shaft). About the sprocket of the pedal assembly 24 there is trained an endless chain 25 which transmits torque to a rear wheel 26 held in the dropout plates 20a, 20b.

On the horizontal length portion of the lower support tubes 2a, 2b there is mounted a platform 27 bolted or otherwise secured to the struts 12 and 13 and serving for supporting the user when the scooter/bicycle is utilized as a scooter. A kickstand 28, having a generally inverted U-shape with downwardly divergent legs and oppositely-oriented feet at the end of the legs is secured to the front strut 12.

The scooter/bicycle may be provided with the usual bicycle accessories such as brakes, lights, rearview mirrors, bells, etc. (not shown).

It is noted that particularly by virtue of the specially structured support tube assembly 1 with its dual lower support tube 2a, 2b and its upper support tube 3 a lightweight, yet horizontally and vertically very stable construction is obtained which in a superior manner resists the various and different horizontal and vertical stresses to which the vehicle is exposed when used as a scooter or as a bicycle.

It will be understood that the above description of the present invention is susceptible to various modifications, changes and adaptations, and the same are intended to be comprehended within the meaning and range of equivalents of the appended claims.

What is claimed is:

1. A bicycle/scooter combination comprising
   (a) a head tube for carrying a front-wheel supporting fork and a steering assembly;
   (b) a bracket shell for supporting a pedal assembly;
   (c) a seat tube having a lower end secured to said bracket shell and being arranged for supporting a seat assembly;
   (d) a support tube assembly including
      (1) two lower support tubes each having a front terminus affixed to said head tube at a first location thereof; a downwardly extending front portion; a rearwardly extending horizontal portion adjoining said downwardly extending front portion; and an upwardly extending rear portion including a rear terminus of respective said lower support tubes; said rear terminus being affixed to said bracket shell and said upwardly extending rear portion being a continuation of said rearwardly extending horizontal portion;
      (2) an upper support tube having an upper terminus affixed to said head tube at a second location thereof; said second location being at a distance above said first location; said upper support tube extending downwardly and having a lower terminus;
      (3) connecting means for attaching said lower terminus of said upper support tube to said rearwardly extending horizontal portion of said lower support tubes;
   (e) a horizontal platform supported by the rearwardly extending horizontal portions of said lower support tubes; and
   (f) chain stays each having a front end affixed to the upwardly extending rear portions of the lower support tubes and a rear end carrying a rear-wheel supporting plate.

2. A bicycle/scooter combination according to claim 1, wherein said lower terminus of said upper support tube is situated between the lower support tubes at the rearwardly extending horizontal portion thereof.

3. A bicycle/scooter combination according to claim 1, wherein said connecting means comprises a strut extending between and affixed to the lower support tubes at the rearwardly extending horizontal portion thereof; said lower terminus of said upper support tube being affixed to said strut.

4. A bicycle/scooter combination according to claim 1, wherein said downwardly extending front portions are downwardly divergent; said rearwardly extending horizontal portions are parallel and horizontally spaced from one another and said upwardly extending rear portions are upwardly convergent.

5. A bicycle/scooter combination according to claim 1, wherein said front ends of said chain stays are affixed to said upwardly extending rear portions approximately 3.5 inches below said bracket shell.

6. A bicycle/scooter combination according to claim 1, further comprising seat stays each having a front end affixed to said seat tube and a rear end carrying said rear-wheel supporting plate.

* * * * *